Figure 14:
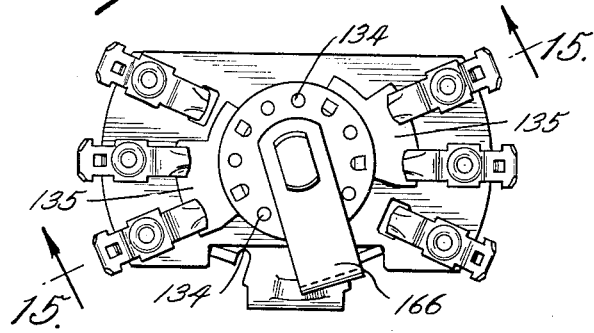

July 2, 1940.  K. C. ALLISON ET AL  2,206,655
ELECTRIC SWITCH
Filed June 19, 1937  3 Sheets-Sheet 1
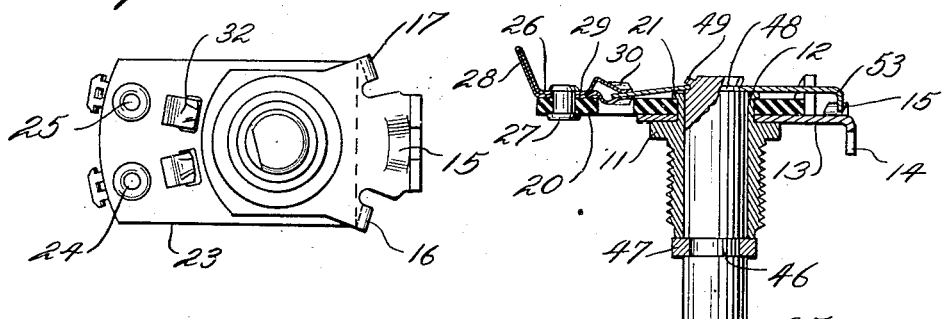
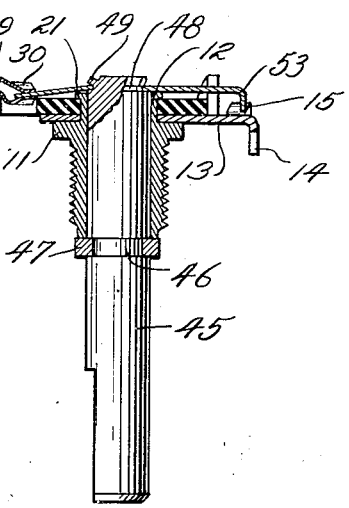
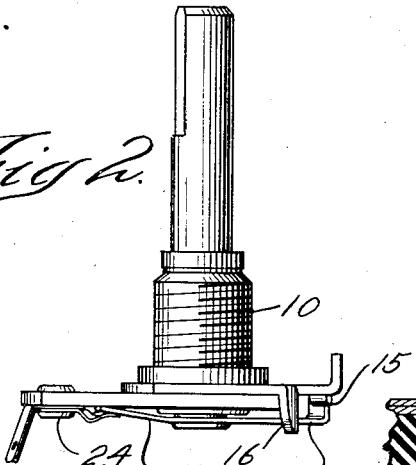
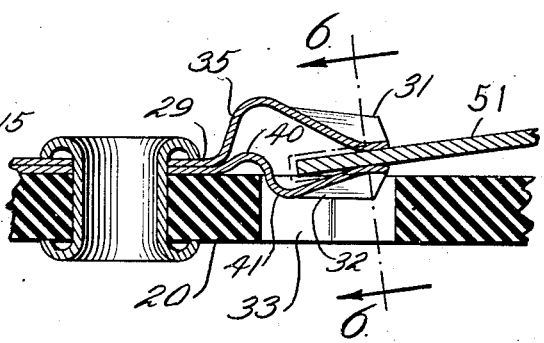
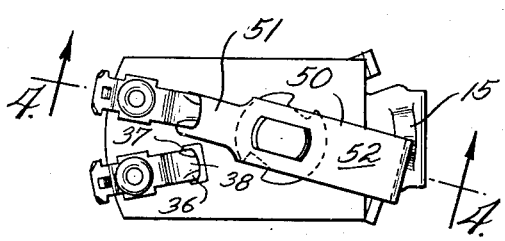
Inventors:
Kenneth C. Allison &
Edward J. Mastney
By:- Robert L. Palen
Atty.

July 2, 1940.　　K. C. ALLISON ET AL　　2,206,655
ELECTRIC SWITCH
Filed June 19, 1937　　3 Sheets-Sheet 2
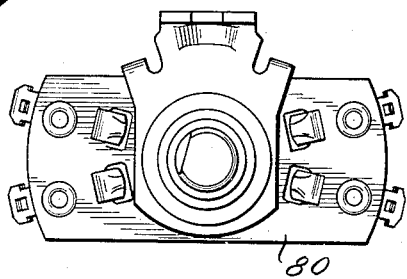
Fig. 7.
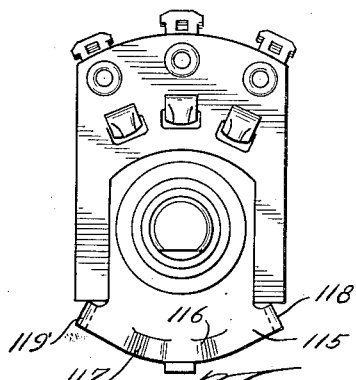
Fig. 12.
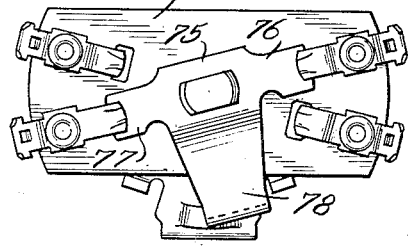
Fig. 8.
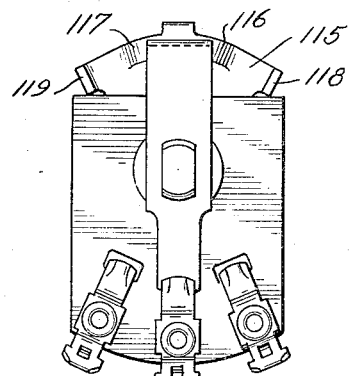
Fig. 13.
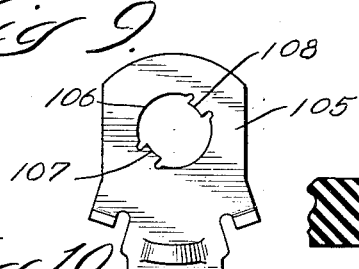
Fig. 9.
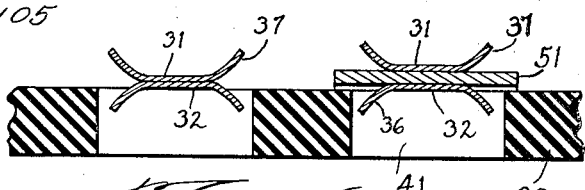
Fig. 6.
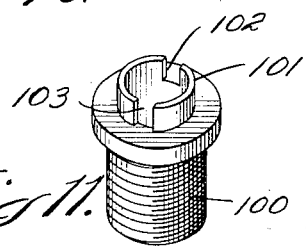
Fig. 10.
Fig. 11.
Inventors:
Kenneth C. Allison &
Edward J. Mastney.
By:- Robert L. Kahn Atty.

July 2, 1940.          K. C. ALLISON ET AL          2,206,655
                         ELECTRIC SWITCH
                       Filed June 19, 1937          3 Sheets-Sheet 3

Inventors:
Kenneth C. Allison &
Edward J. Mastney.
By:— Robert L. Kahn   Atty.

Patented July 2, 1940

2,206,655

UNITED STATES PATENT OFFICE 2,206,655

ELECTRIC SWITCH

Kenneth C. Allison, Arlington Heights, and Edward J. Mastney, Berwyn, Ill., assignors to Oak Manufacturing Company, Chicago, Ill., a corporation of Illinois Application June 19, 1937, Serial No. 149,140

1 Claim. (Cl. 200—15)

This invention relates to electric switches and more particularly to small compact switches such as are used in radio receivers and similar devices. It is a desirable feature to provide a switch with an index action so designed that the parts fit compactly together to make an assembly which will take up a minimum of room. Because of the delicacy of the circuits controlled, it is also necessary that the switching action be uniform over a substantially long useful life. Flexibility with regard to switching combinations is also important.

Figure 17:
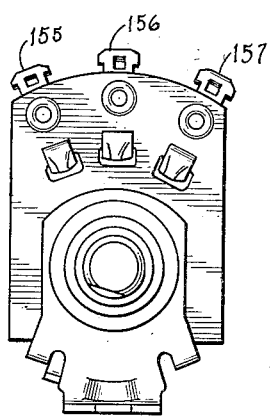
Figure 15:
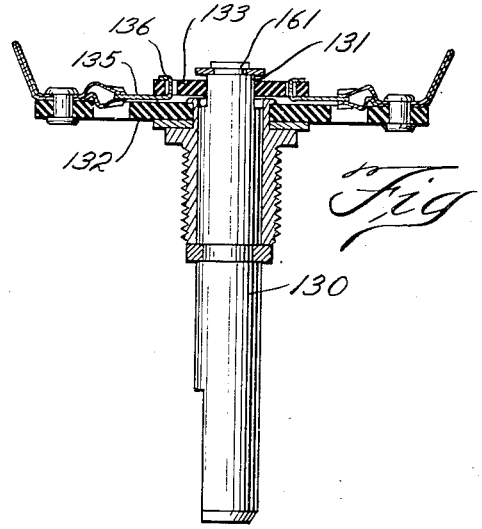
Figure 18:
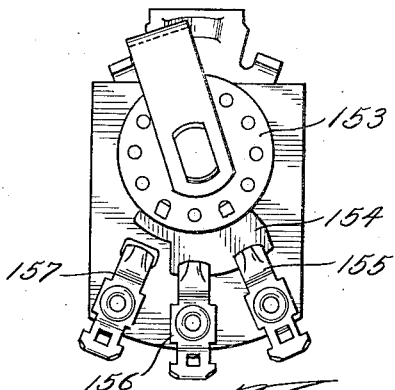
Figure 16:
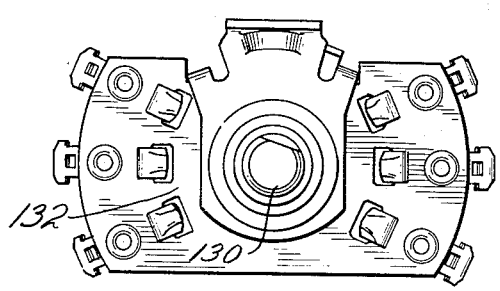

Referring to the drawings:

Figure 1 is a top view of one form of a switch.
Figure 2 is a side view of the same switch.
Figure 3 is a bottom view of the switch.
Figure 4 is a section on line 4—4 of Figure 3.
Figure 5 is an enlarged sectional detail illustrating the switching action.
Figure 6 is a section on line 6—6 of Figure 5.
Figure 7 is a top view of a modified form of switch.
Figure 8 is a bottom view of the same switch.
Figures 9 to 11 inclusive are details of parts of the switch assembly.
Figure 12 is a top view of another modification.
Figure 13 is a bottom view of the switch of Figure 12.
Figure 14 is a top view of still another modification.
Figure 15 is a section on line 15—15 of Figure 14.
Figure 16 is a bottom view of the switch of Figure 14.
Figures 17 and 18 are top and bottom views of an additional modification.

Referring to Figures 1 to 4 inclusive, the switch comprises a bushing 10 of any metal such as brass or iron, having a shoulder 11. Beyond shoulder 11 a thin sleeve-like portion 12 is provided. Bushing 10 is adapted to support an index plate 13 immediately against shoulder 11. Index plate 13 is preferably of stamped sheet metal and has an end portion thereof bent to form a finger 14. Index plate 13 has one or more bumps 15 formed thereon, while on each side of the bumps and acting as stops, are fingers 16 and 17 bent upwardly as viewed in Figure 4.

Supported above index plate 13 is an insulating stator 20 of any rigid material such as Bakelite. The stator is adapted to fit snugly around portion 12 of the bushing and in order to maintain the bushing index plate and stator intact, the end 21 of the bushing is rolled over against the stator material to hold the same tightly in position. As shown in Figure 1, stator 20 is of a generally rectangular shape and eccentrically mounted so as to leave a portion 23 for switching purposes. A pair of apertures 24 and 25 are provided in the stator and these are preferably located on the circumference of a circle concentric with bushing 10. Each aperture 24 and 25 may have mounted therein a stationary contact 26 maintained in position by an eyelet 27. Contact 26 is preferably formed of spring metal doubled over to form a soldering lug 28, a mounting portion 29 and a contacting portion 30. Contacting portion 30 is shaped to provide a pair of jaws 31 and 32. Stator 20 is apertured at 33 to permit lower jaw 32 of the contact to operate therein.

As is clearly seen in Figure 5, contact jaw 31 comprises a bent hinge portion 35 immediately adjacent mounting portion 29 of the clip. Hinge portion 35 as shown in the figure, is bent upwardly at a rather large angle from the stator 20 and thereafter, upper jaw 31 proper is bent downwardly. The side tips 36 and 37 (Figure 3) are bent upwardly leaving the center portion 38 of the jaw edge as the contact making portion thereof.

Lower jaw 32 has a doubly curved hinge portion comprising an upwardly bent portion 40 and a downwardly bent portion 41 extending from the mounting portion 29 of the clip. Upwardly bent portion 40 as shown in Figure 5, is more rounded and smaller in extent than the upper contact hinge portion. The lower bent portion 41 causes the spring material to extend well into aperture 33 of the stator. The lower jaw 32 then extends upwardly from lower hinge portion 41. The extreme jaw edges of the lower portion 32 are shaped in the same manner as the upper jaw 31.

Rotatively disposed within bushing 10 is a shaft 45 having a circular slot 46 which is normally adapted to go near the end of bushing 10. The shaft is maintained in position longitudinally by means of a C washer 47. Shaft 45 extends through bushing 10 and beyond the stator 20, the aperturing portion of the shaft beyond the stator, is squared at 48 and is adapted to carry a metallic member 50 functioning as a combined rotor contact and index spring. The end of the shaft is peaned over at 49 to hold member 50 rigidly on the shaft. Member 50 is preferably of some suitable metal such as phosphor bronze or spring copper and comprises a portion 51 functioning as a rotor contact and a portion 52 bent over to form a finger 53 functioning as an index spring. Portion 52 is adapted to cooperate with bump 15 on the index plate and is limited in its travel by end stops 16 and 17 so that a definite index action results.

Contact portion 51 is preferably wider than apertures 33 in the stator and is preshaped so that the end edge 51 tends to press tightly against stator 20. In the normal operation of the switch, the side edge of contact portion 51 is adapted to enter the distended tips of the stator contacts and open these contacts to enter between he opposing jaws. As is well understood, the spring stator jaws tend to close at all times. In the normal mounting of the stator jaws, the jaws tend to meet in a line just slightly above the surface of stator 20. By having the rotor end edge of 51 pressed tightly against the stator material, and by having the contact portion of 51 slope away from stator 20 the entering side edge of contact portion 51 will always enter the jaws at their normal level above the stator 20. This automatically takes up all the variations in thickness of the assembled parts and provides the necessary clearance above the stator at the line of contact between 51 and jaws 31 and 32 to assure perfect contact alignment and at the same time to prevent the rotor contact from carrying dirt or particles of insulating material from 20 into the contacts. In the normal manufacture of the device, the rotor contact is substantially stiffer than the stator contacts and would normally tend to spring the stator contacts beyond the elastic limit unless some control over the rotor contact spring force were present. By the provision of the apertures in the stator and having the rotor contact wider than the aperture, the insulating material of the stator takes up the pressure of the rotor contact spring.

Referring to Figures 7 and 8, a switch is shown wherein the rotor contact 75 is provided with opposed contact blades 76 and 77 and an index spring 78 at right angles thereto. In this construction, the stator 80 is provided with opposing sets of stator contacts.

In Figures 9 to 11 inclusive, a modified construction of bushing is shown wherein the parts align themselves automatically. In this construction bushing 100 has its end portion 101 slotted at diametrically opposed points 102 and 103. This slotting may be done in automatic screw machines. An index plate 105 is provided with an aperture 106 having opposed tongues 107 and 108 so shaped as to lock on bushing 100 when fitted together. Stator 110 is also apertured at 111 and has tongues 112 and 113 so that the entire assembly will go together in perfect alignment. The edge portion 101 of the bushing may then be rolled over against stator 110 to hold the assembly in position.

Referring to Figures 12 and 13, a three position switch is shown in which the index plate 115 is provided with a pair of bumps 116 and 117 and end stops 118 and 119. It is obvious that the angle travel of the rotor may be enlarged with this construction up to a maximum or around 180 degrees. It is also possible to provide as many index positions as may be desired within this range of travel.

Referring to Figures 14 to 18 inclusive, the switches there shown are the type wherein the rotor contact is not grounded. The previously described constructions have all had the rotor contact directly mounted on the operating shaft so that a grounded switch resulted. It is, however, desirable in many cases to provide a switch where two or more poles thereof are insulated from ground. To this end, shaft 130 has a squared end portion 131 extending above stator 132. Mounted on this squared portion is an insulating rotor disc 133 preferably circular and having a plurality of apertures 134 disposed near the edge thereof. One or more contacts 135 may be provided. These contacts are flat and have fingers 136 along the inner portions thereof. These fingers are adapted to be threaded through one or more of the apertures 134 and tend to maintain the contact rigidly on rotor disc 133. As shown in Figure 15, rotor contacts 135 are preferably mounted on the side of the rotor disc nearest stator 132 and extend well toward the stator contacts so as to slide therebetween. Normally, rotor disc 133 is so mounted that a slight clearance between rotor contacts 135 and stator 132 is present. The index spring arm is mounted directly on the shaft and, as shown in Figures 14 and 15, index arm 160 is mounted on a squared portion 161 of the shaft. This squared portion 161 is smaller than the squared portion 131 for the rotor disc, so that index arm 161 is held above rotor disc 133 providing clearance enough to allow floating of the rotor disc longitudinally along its squared portion 131 of shaft 130. At the same time location of index arm 161 above rotor disc 133 is such that the longitudinal movement of rotor disc is limited within the range permitted by the flared sides 36 and 37 of clips. This is particularly important when clip arrangement is such that in some one position of the switch, clips are engaging rotor contacts only on one side of the switch. In the form shown in Figures 14 to 16, inclusive, stator 132 is provided with opposed sets of three stator contacts each. However, the insulated rotor construction may be modified in the same manner as the preceding rotor structures and in Figures 17 and 18, only one series of stator contacts is shown. In this case, rotor disc 153 has a single contact 154 cooperating with stator contacts 155 to 157 inclusive.

What is claimed is:

An electric switch comprising a pair of relatively movable assemblies, one assembly including a rigid insulating base member having a flat face, at least one spring contact carried by said member, said contact comprising a pair of opposed spring jaws with one jaw disposed in a recess in said member and the other jaw disposed beyond the member face, said jaws normally meeting outside of said member face plane and adapted to be separated during switching operation to force the one jaw deeper into the recess and the other jaw away from said member face, the other assembly including a rigid contact adapted to slide between the spring contact jaws, means for mounting said rigid contact on said assembly so that only an edge bears against said base member along the face thereof in all switch positions, means on each of said assemblies adapted to cooperate for producing an index action, one of said means including a spring member and the other including a plate having index indentations, said means being so disposed that the index movement occurs in a plane substantially parallel to the rigid contact, the spring of said index means cooperating with said index plate to produce a force substantially perpendicular to the plane of said rigid contact, said rigid contact and the corresponding index means carried by said assembly being formed as one unitary member.

KENNETH C. ALLISON.
EDWARD J. MASTNEY.